(No Model.) 6 Sheets—Sheet 1.
H. C. LOWRIE.
SLOTTED CONDUIT COVER AND MEANS FOR CONTROLLING THE SAME.
No. 375,370. Patented Dec. 27, 1887.
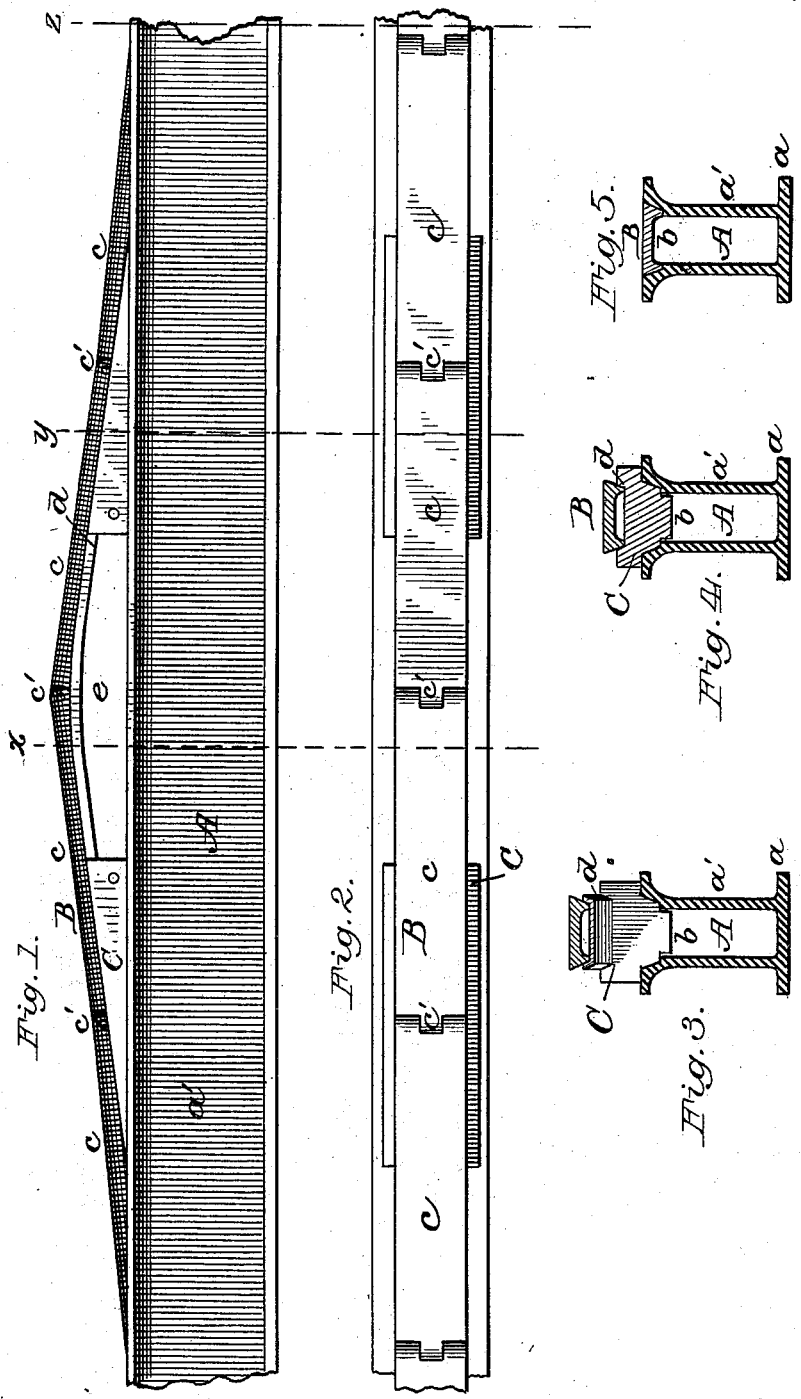

(No Model.) 6 Sheets—Sheet 2.
H. C. LOWRIE.
SLOTTED CONDUIT COVER AND MEANS FOR CONTROLLING THE SAME.
No. 375,370. Patented Dec. 27, 1887.
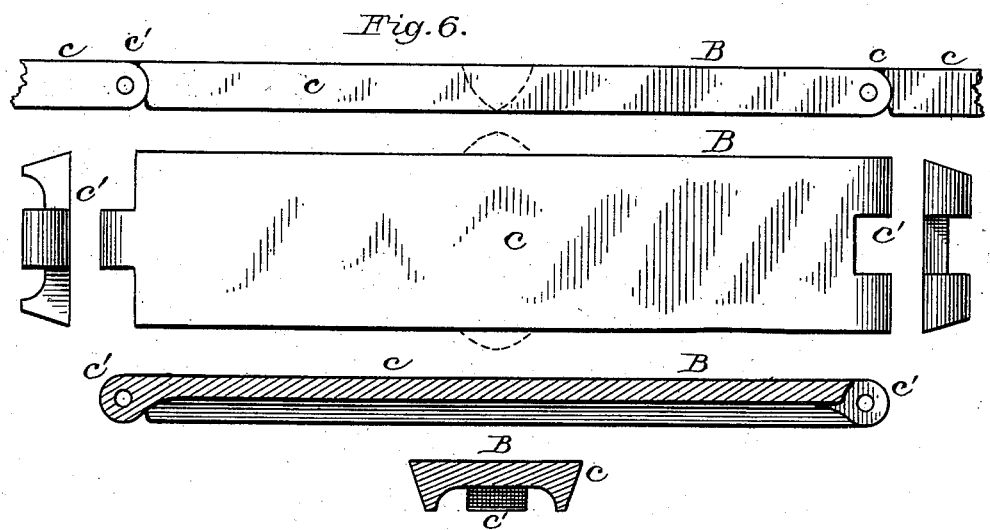
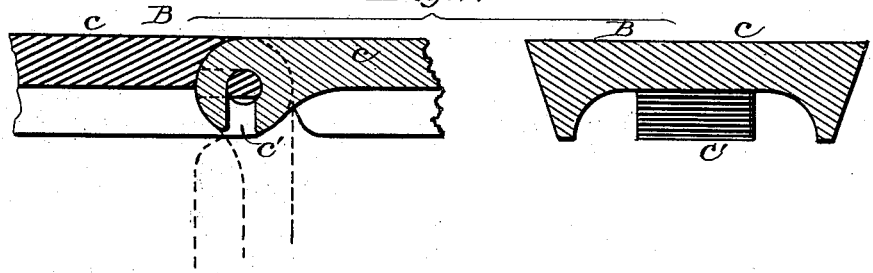
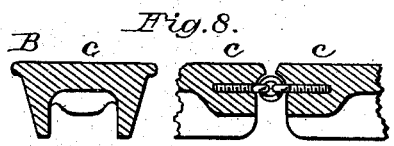
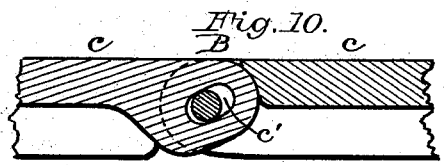
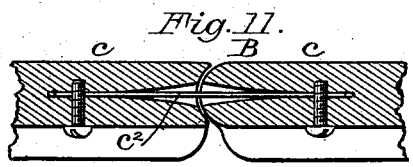
Witnesses
Philip F. Larner
Lowell Beutts
Inventor
Harvey C. Lowrie
By his Attorney

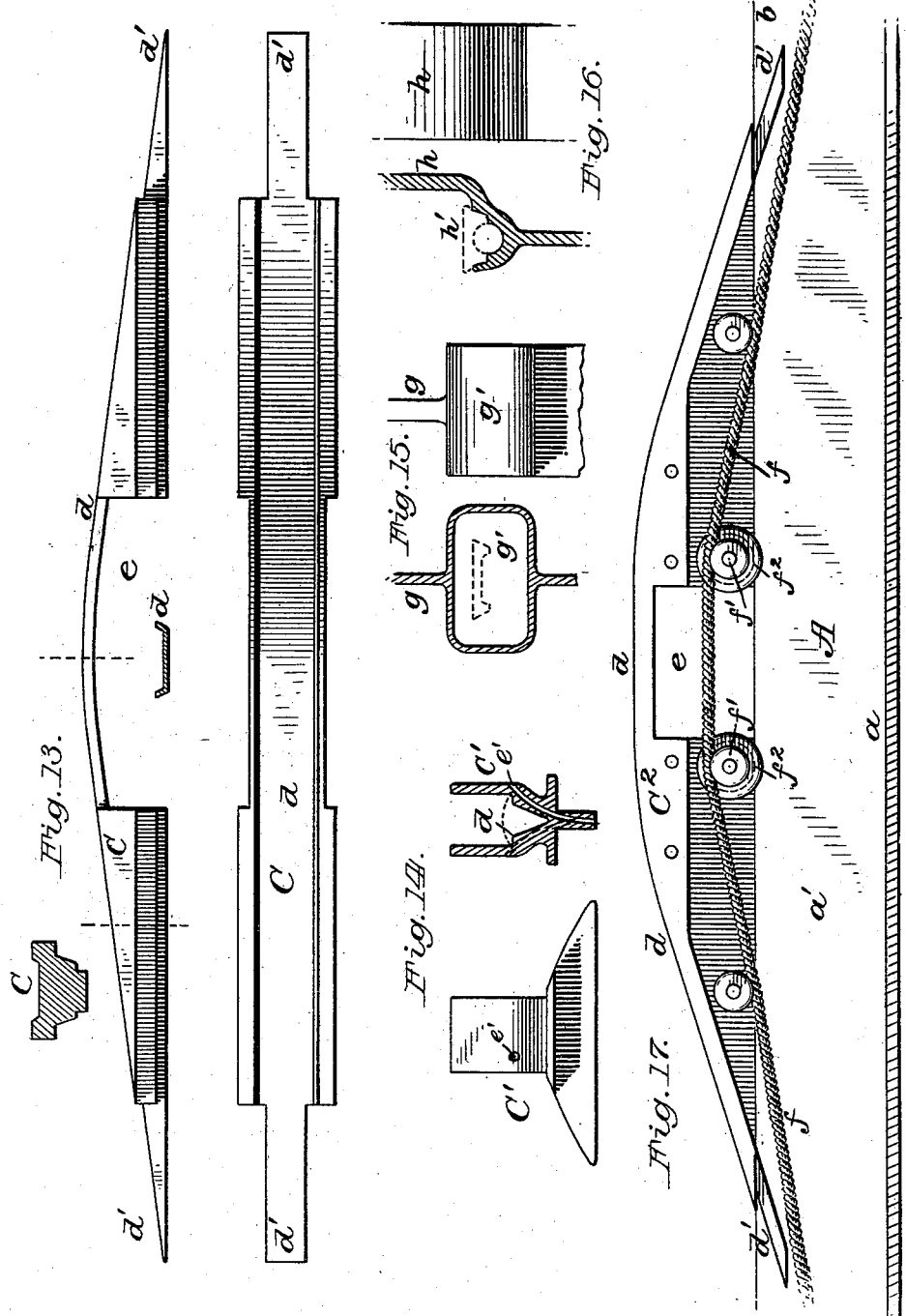

(No Model.) 6 Sheets—Sheet 4.
H. C. LOWRIE.
SLOTTED CONDUIT COVER AND MEANS FOR CONTROLLING THE SAME.
No. 375,370. Patented Dec. 27, 1887.
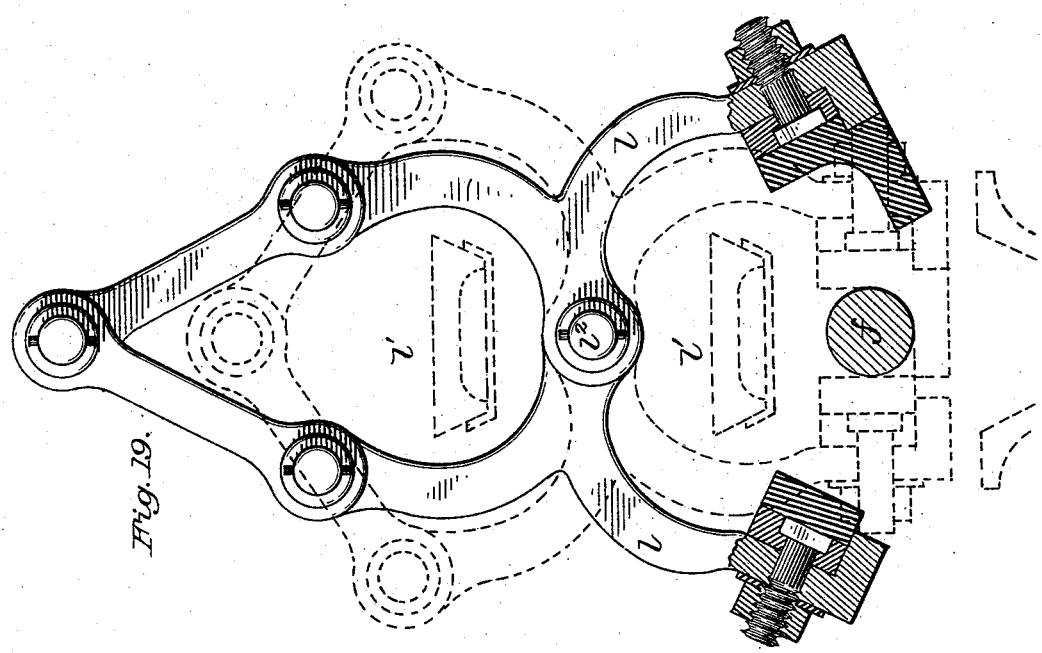
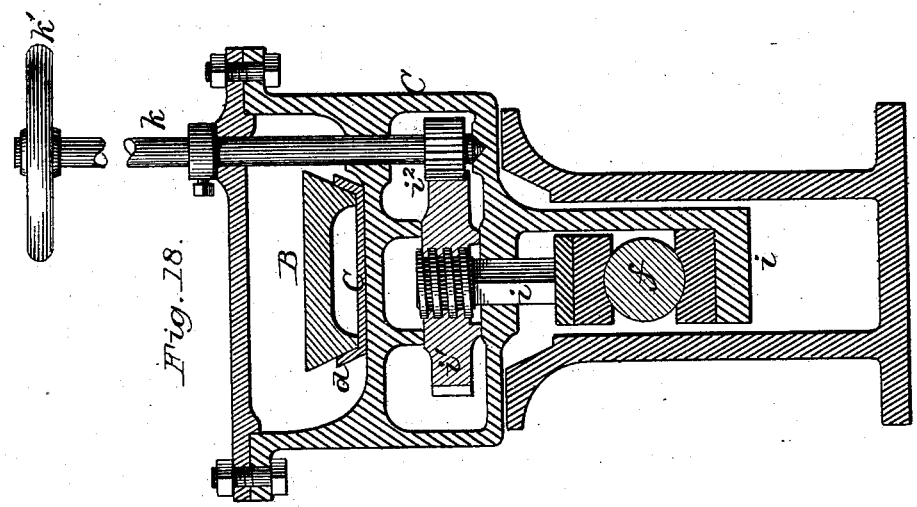

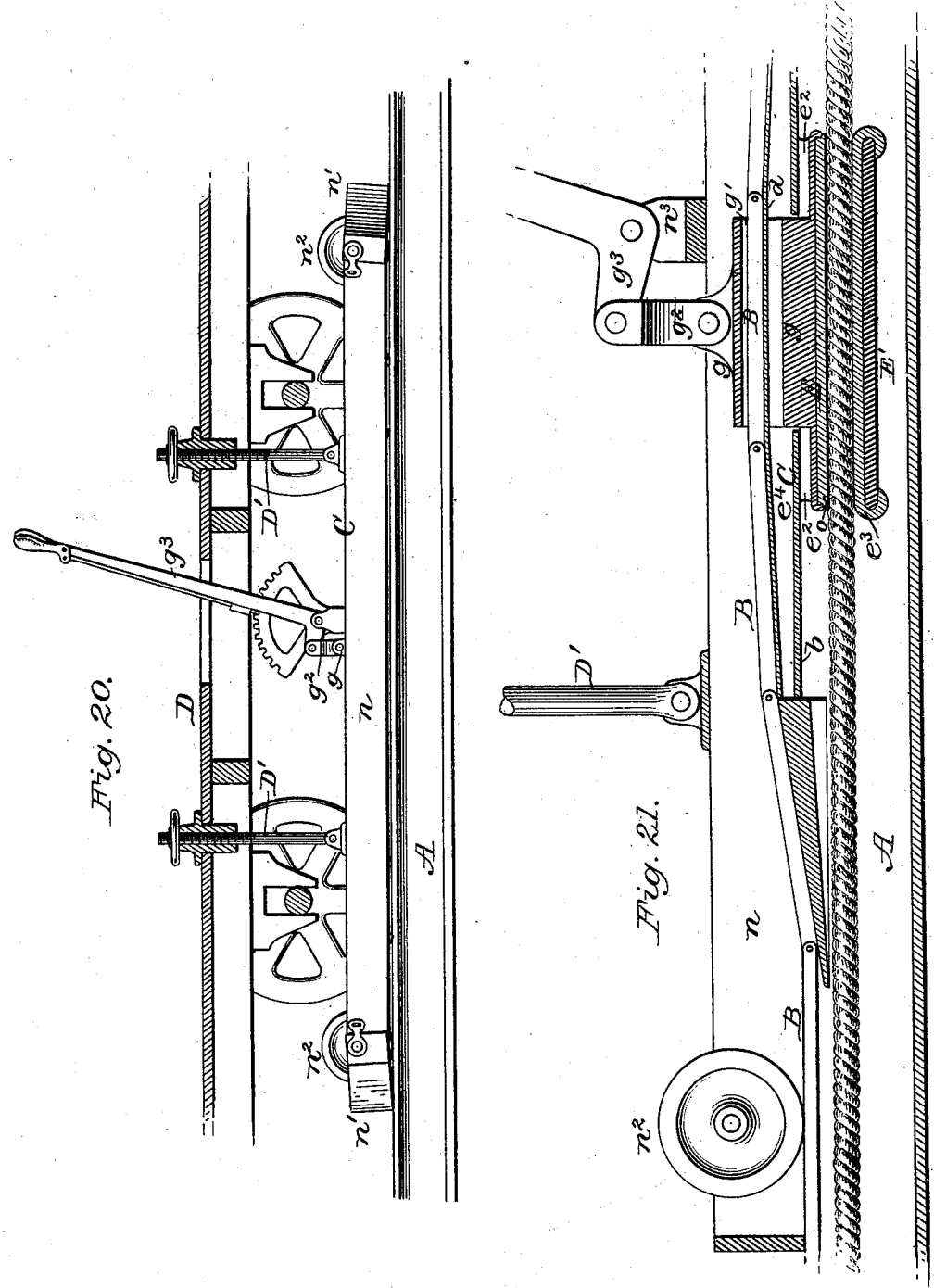

(No Model.) 6 Sheets—Sheet 6.
H. C. LOWRIE.
SLOTTED CONDUIT COVER AND MEANS FOR CONTROLLING THE SAME.
No. 375,370. Patented Dec. 27, 1887.
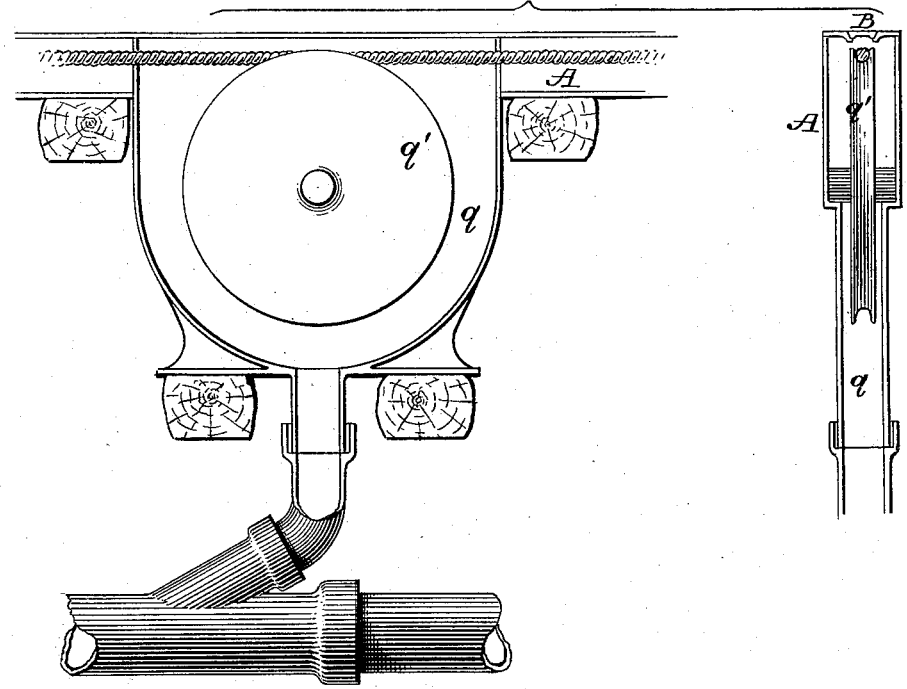
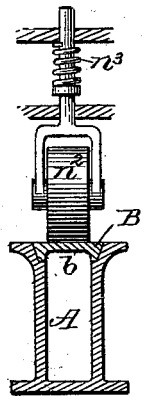
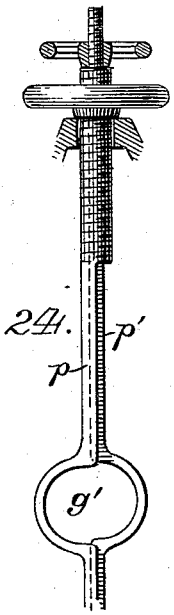
Witnesses
Philip F. Larner
Lowell Beattle
Inventor
Harvey C. Lowrie
By his Attorney

UNITED STATES PATENT OFFICE.

HARVEY C. LOWRIE, OF DENVER, COLORADO.

SLOTTED CONDUIT-COVER AND MEANS FOR CONTROLLING THE SAME.

SPECIFICATION forming part of Letters Patent No. 375,370, dated December 27, 1887.

Application filed March 8, 1887. Serial No. 230,138. (No model.)

*To all whom it may concern:*

Be it known that I, HARVEY C. LOWRIE, of Denver, in the county of Arapahoe and State of Colorado, have invented certain new and useful Improvements in Slotted Conduit-Covers and Means for Controlling the Same in Connection with Vehicles Propelled by Power Derived from a Stationary Motor; and I do hereby declare that the following specification, taken in connection with the drawings furnished and forming a part of the same, is a clear, true, and complete description of my invention.

The main features of my said improvements have been specially devised with reference to their use in connection with what are known as "cable railways," and especially with that type thereof in which a propelling-cable is located in a road-bed conduit which is open at its top or slotted to afford access to the cable for gripping and releasing contrivances carried on a car or truck; but they are equally applicable to that variety known as "electric railways," in which the one or more electric conductors are located within a conduit which is slotted to afford more or less continuous electric contacts with said conductors, and placing them in circuit with a motor carried by a car or truck. For whatever use such open or slotted conduits may be desired, it has long been deemed desirable to guard them against the clogging influences of dirt, ice, and snow liable to enter at the slot, and various means have been heretofore devised with a view to effecting those ends. So far as I know, all prior slot-covers have been constructed in independent sections, single or in pairs, and they have either been hinged at one or both sides of the slot to the conduit, so as to swing in a vertical plane, or arranged to slide or move laterally toward and from the center of the slot. The prime objects of my invention are to obviate the complexity and cost incident to covers which are hinged or otherwise attached to the conduit, and also to provide for greater strength or durability, as well as for convenience in applying and removing the covers, as will be desirable in some localities during stormy seasons.

Instead of having covers which are in any way attached to the conduit, I have for the first time devised a cover which is an independent structure, but adapted to properly co-operate with any desired length of conduit, and is maintained in proper relations therewith, regardless of the passage of cars or trucks carrying pendent devices, which occupy the interior of the conduit by way of its slot, and also regardless of the overriding of the conduit by teams, as in ordinary streets and roadways.

My novel conduit-cover is constructed in sections, each of convenient length, and each fitted to properly occupy the slot in the conduit, and to afford reliable bearing-contacts without unduly straining the conduit laterally, and these sections are flexibly coupled together into a continuous series, and, as a whole, constitute a chain-like cover, which normally rests securely in its seat within the conduit slot or opening.

I am aware that it has heretofore been proposed to employ, with slotted pneumatic tubes, long flexible valves for tightly covering the slot to exclude air therefrom, except when raised by a contrivance carried by a car. These valves are essentially long strap-like or band-like structures, and without any seams or openings through which air may enter, and they are also essentially composed of coated canvas or rubber, or other such soft flexible material as will enable them to afford an air-tight closure against the outer surfaces of the tube at the two sides of the slot; and although it has been heretofore proposed to laterally stiffen such valves by means of short metal plates applied to the upper surfaces thereof, said plates could not change or affect their strap-like or band-like character, and such valves are clearly distinguished from my novel conduit-covers, which are essentially chain-like in their structure and character. Moreover, said prior pneumatic tubes, whether they be considered with reference to essential features in their construction or with reference to their prime functions in connection with a pneumatic railway, are not the equivalents of the conduits employed by me, whether said conduits are adapted for use in connection with a street-railway operated by means of a cable or by electricity, or whether said conduit is provided with my novel chain-like cover, or even with a strap-like cover; and it is to be understood that my invention in no manner pertains to pneumatic railways, and that I know of nothing which I have invented which could be used to any substantial advantage in connection with pneumatic tubes from which air is exhausted for enabling atmospheric pressure to serve as a car-propelling medium, it being obvious that an air-tight strap-valve could not be employed in connection with a street-railway exposed to slush, ice, and snow.

Each section of my chain-like cover is not only held in place by its own weight, but also by those coupled thereto at its ends, the tendency of each being to resist the lateral displacement of the next adjacent sections, and the vertical displacement of any one section necessarily involves a vertical displacement of the whole or a portion of each adjacent section, leaving those with which the latter are coupled still in their seats, so that an undue lateral displacement of raised sections is practically impossible, except as the result of special manipulation.

My chain-cover can be variously constructed without departure from my invention, it being immaterial in what manner the sections are joined together, so long as the requisite flexibility in a vertical plane is provided for and their edge contour properly conforms to the upper portion of the conduit slot or opening in which they are to be seated.

With my novel chain-cover it is necessary to employ a novel cover lifting and supporting raceway, which can be carried pendent beneath a truck or car in line with the conduit-slot, and with its lower portion so far entered therein as to slightly underlie the plane occupied by the chain cover, and enable it to lift said cover and serve as a supporting-raceway for the elevated portion thereof during the progress of the raceway with a truck or car. This chain-supporting raceway may be widely varied in construction and variously mounted on a car or truck without departure from my invention, so long as said raceway is capable of progressively plowing beneath said cover, elevating it and guiding it again to its seat in the slot; but as an essential feature said raceway must be so formed or shaped as to afford beneath it and the elevated cover such access to the interior of the conduit as may be requisite for affording communication between the car or truck and the power-communicating contrivances within the conduit. Otherwise stated, the chain-cover raceway must leave some portions of the slot beneath the elevated cover accessible to the occupancy of the slot by cable-gripping contrivances, or enable a portion of a cable to be lifted to and maintained in a plane above the road-bed, as in some cable roads, or to enable pendent electric contacts to be properly operated in connection with electric conductors within the conduit.

In connection with the aforesaid proposed pneumatic railways, the strap-like valve was to be progressively raised in some cases by means of a lifter pendent from a truck or car, and in other cases by means of a truck rolling within the air-tube and coupled to a railway-truck above the tube.

It is to be understood that the raceway devised by me possesses certain novel features which enable it to properly lift and support my novel chain-like cover, and certain other features which, regardless of the character of the cover, prevent the entrance of obstructive matter to the uncovered portion of the conduit, as well as to otherwise properly control the slush, ice, or snow liable to be encountered on street-railways.

In the development of the main portions of my invention I have devised many minor features, all of which, after a full description of the drawings, will be specified in the several clauses of claim hereunto annexed.

Referring to the drawings, Figure 1 illustrates in side view a slotted conduit, one form of my chain-like cover, and my cover-supporting raceway. Fig. 2 is a top view of the same. Figs. 3, 4, and 5, respectively, illustrate the same in cross vertical section on lines $x$, $y$, and $z$. Fig. 6 illustrates in several views a portion of my conduit-cover in one of its desirable forms. Fig. 7, in two views, illustrates still another form, the sections being hinged together, but readily detachable. Fig. 8, in cross-section and longitudinal section, illustrates another way of hinging the cover-sections together, involving the use of eyebolts and rings. Fig. 9, in similar views, illustrates still another form of my cover, in which a wrought-metal chain is incorporated in cast-metal cover-sections. Fig. 10, in longitudinal section, illustrates my cover provided with a hinge-joint, with special provision for free movement at the hinge-pin. Fig. 11, in longitudinal section, illustrates one form of my cover in which the flexibility and hinging of the sections is dependent upon one or more flexible metal plates on each joint. Fig. 12, in end view and section, illustrates one end of my cover provided with a bearing-wheel for enabling it to be more readily picked up by the raceway. Fig. 13, in side and top views and lateral sections, illustrates one form of my cover-supporting raceway. Fig. 14, in side and sectional views, illustrates another form of my cover-supporting raceway adapted to receive electric conductors. Figs. 15 and 16 each illustrates shanks of grip-bars shaped to afford a passage for my cover. Fig. 17, in longitudinal section, illustrates one form of my cover-supporting raceway for working with a cable which is lifted above the top of the conduit and supported by the raceway. Fig. 18, in cross-section, illustrates a cable-conduit, my cover-supporting raceway, the cover, and a grip operated by gearing and a screw. Fig. 19 illustrates a form of gripping apparatus capable of use with the lifted cable of Fig. 17, and also affording passages for my conduit-cover at either of two points in different horizontal planes. Fig. 20 illustrates a truck or car in longitudinal section, with my cover-supporting raceway and a conduit in side view. Fig. 21 illustrates the cable grip in side view, enlarged, and a portion of the raceway with one of its side plates removed, and the cable-conduit. Fig. 22, in cross-section, illustrates one of the cover-raceway bearing-wheels as when backed by a spring. Fig. 23 illustrates the guide-wheels and wheel-pits located at intervals in the conduit. Fig. 24 illustrates the shanks of a well-known form of gripping apparatus adapted to afford a passage for my conduit-cover.

Referring to Figs. 1 to 5, inclusive, it is to be understood that the conduit A is in its simplest form, and that it is wholly immaterial as to what power-communicating appliances it may contain. It is in form a mere spout, having a flanged bottom, $a$, and side plates, $a'$, the latter at their upper edges being flanged for strengthening purposes. Such a conduit may be made of cast-iron and complete in lengths convenient for casting and handling, or it may be composite, with the sides and bottom in separate pieces and of cast or wrought iron. The conduit would of course be mounted on a suitable foundation, and be provided at proper points with guide-wheels and wheel-pits, as shown in Fig. 23.

The cover B, for closing the opening or slot in the conduit, is composed of a series of rigid sections, $c$, flexibly jointed together at their ends $c'$, and hence any one length of cover is in substance a specially-formed chain. As it is important that each section should be well seated in the opening or slot $b$, the latter may be provided with inclined sides, and in order that the cover may not unduly operate as a wedge when teams are driven across it, the conduit should afford proper bearing-surfaces for the cover at each side of the slot. These sections $c$ may be composed of hard wood, or of cast-iron or steel, or of wrought metal struck up in dies. In Fig. 6 the sections $c$ are provided with hinged joints at $c'$ and coupled by detachable hinge-rods or pintles. In Fig. 7 the sections $c$ are provided with open hinge-joints, after the manner of some drive-chains, thus enabling the cover to be readily taken apart and put together. In Fig. 8 the sections $c$ are united by means of eyebolts and rings, and in Fig. 9 a small chain is attached to or cast into sections; or in lieu of said chain a wire rope can be used, thus providing cheaply for any desired length of cover. In Fig. 10 the sections $c$ are coupled together by a cheap form of hinge-joint, each pintle having considerable play in its holes lengthwise of the section. In Fig. 11 the sections $c$ are united by means of one or two metal plates, $c^2$, at each joint, said plates occupying longitudinal recesses in the ends of the sections and secured therein, so that they serve to couple the sections together and afford the desired flexibility. If these plates be provided with ample room in their recesses, they need not even be flexible; but a specially desirable form of chain-cover will be produced if the said plates be snugly confined at their ends in their recesses and are sufficiently flexible and springy to permit the desired extent of flexure at the joints, which, as a rule, need be comparatively slight if quite short sections be employed. All of these forms have more or less practical value, and many others might have been shown; but it is believed that with this disclosure persons skilled in the art will be readily enabled to make proper selection for use under particular circumstances, or to make such variations therein as special requirements may in any case seem to demand.

In some cases the cover-sections may at intervals be provided with angular lugs on their under sides, or project laterally, as indicated in dotted lines in Fig. 6, and the conduit provided with similarly-shaped and properly-spaced recesses, so that when a section having a lug drops to its seat said lug will by occupying its recess thereby obviate any undue longitudinal displacement of the cover.

It will be obvious that independent sections, each hinged at its ends to other similar sections, affords a cover which is essentially chain-like in its character, and that each section, after the manner of a link in a chain, is capable of certain free and independent movements, vertically and laterally and torsionally, thus enabling the sections to independently adapt themselves to their seats, and to operate in a desirable manner in a curved slot.

My cover-supporting raceway is novel in construction in that its two ends project into the conduit, and it has from end to end a central passage or raceway, which is progressively occupied by the cover-chain B, and it is equally novel in function in that it progressively lifts and wholly supports the sections of the entire lifted portion of the cover and guides them back to their seats in the conduit-slot, thus widely differing from plows projecting forwardly from a central vertically-pendent post, as heretofore, for either lifting covers hinged to one or both of the sides of the conduit-slot, or for laterally displacing sliding covers moving in guides provided therefor in the conduit.

My cover-supporting raceway is also novel in that it is inclosed at the sides, so that when the cover is lifted slush and snow cannot enter the slot, and in certain other novel features, which will be hereinafter specially designated.

My supporting-raceway can be largely varied in form and dimensions, as well as in its details of construction, without departure from my invention, it being obvious, for instance, that while a supporting-raceway suitable for use in connection with my chain-cover and a traction-cable conduit might with good results be also used in connection with a conduit containing one or more electric conductors, a cover-supporting raceway specially adapted to the latter use might be impracticable for use with a traction-cable, as will be hereinafter fully indicated.

In Figs. 1, 2, 3, 4, and 13 the cover-supporting raceway C is of a form capable of use with either a traction-cable or electric conductors.

The bed $d$ of the raceway is longitudinally arched, or inclined downward from its center, and its two ends, $d'$, are adapted to enter and travel within the slot $b$ of the conduit, and in a plane slightly below the cover B. In such instances as will only require a to-and-fro operation on the same track, as on short single-track routes involving the driving of the cable alternately in opposite directions, the raceway need not pass beyond the two ends of the slot-cover; but on the usual longer routes, and with the tracks crossing other roads, the conduit-cover must of course be in varied lengths, so that after dropping the terminal end of one length of cover the raceway must then be able to pick up the initial end of the succeeding cover, and said initial end sections, $c$, are sometimes provided with a bearing-wheel, $d^2$, as shown in Fig. 12, which preferably has an angular face to engage with and ride in a central V-shaped groove on the raceway-bed $d$.

The cover B, in whatever form its cross-sections may be, should present at its under side one or more bearing-surfaces, and the surface of the raceway should so far conform thereto as to evenly support each section, with due reference to as little friction as may be practicable, and also with reference to accuracy in guiding the initial end of a cover, so that it will smoothly travel and be accurately delivered into the conduit-slot at the rear of the raceway. With extra heavy covers for extra wide conduit slots or openings, the entire bed $d$ may be provided with friction-rollers, if need be, each having a contour specially adapted to afford for the cover-sections a smooth and easy bearing. In this supporting-raceway C there is an aperture or opening, as at $e$, preferably centrally located beneath the raceway, which affords access to the interior of the conduit through a portion of the slot or opening from which the cover has been lifted. It will now be understood that this supporting-raceway C is generally moved with or carried beneath a car or truck, and that, so far as relates to the main features of my invention, it is wholly immaterial as to how said raceway may be coupled to the car or truck, or how it may be organized with reference to the contrivances by which power is communicated from the conduit to the said car or truck, or whether said raceway be used without a truck. Inasmuch as said communicating contrivances on a traction-cable railway are radically unlike corresponding contrivances on a railway operated by means of electric conductors within a conduit, it follows that the raceway may be correspondingly modified—as, for instance, as shown in Fig. 14, wherein the raceway C' differs greatly in form and dimensions from the raceway C, but, nevertheless, has the same central longitudinal bed, as at $d$, and its two ends operate the same; but instead of having the same central aperture, $e$, the foot of the raceway occupies the conduit-slot, and one or more passages, $e'$, are provided for receiving electric conductors for communicating between suitable electric contacts carried by the raceway within the conduit and the motor on the truck or car, it being obvious that such electric appliances in no manner relate to my present invention, and hence need not now be specially described.

I will now describe how my cover and its supporting-raceway can be organized for use with a conduit, and a traction-cable, which is lifted through the slot and is carried on guide-wheels beneath a car or truck.

As illustrated in Fig. 17, the raceway $C^2$ should be of considerable length, but have substantially the same bed $d$, and its ends $d'$ arranged to operate as before described. Instead, however, of having only a restricted length of conduit-slot exposed beneath the raceway, a sufficient length is here exposed to admit of a portion of the traction-cable $f$ being lifted through the slot $b$ and to be carried upon the guide-wheels $f'$, the central space at $e$ being laterally accessible to such gripping contrivances as are well adapted to this mode of operation. These guide-wheels $f'$, here shown, are loosely mounted upon the axes of two pairs of larger wheels, $f^2$, which are flanged, like ordinary car-wheels, so as to be able to run on top of the conduit, with their flanges projecting into the slot or opening in the conduit, thus enabling the raceway to be smoothly carried along, even when its entire weight is borne by said wheels. When the raceway is wholly supported and carried by a truck or car, the wheels $f^2$ may sometimes be dispensed with, although they will always be useful for accurately and smoothly guiding the raceway with relation to the conduit.

Having thus described the main features of my invention, I will now describe certain minor features, in connection with gripping devices employed in connection with traction-cables.

It will be seen that the presence of the shank of a grip-bar on a truck or car, and pendent and occupying a vertical plane above and within a conduit-slot, as heretofore, would preclude the use of my chain-cover, and hence the grip shank or bar must be so constructed as to not obstruct the path of the cover B on its raceway, and therefore said grip-bar shank must be provided with a central loop or passage for the cover, or be so offset as to afford such a passage, and in either case to have that portion of the grip-bar which underlies said cover properly occupy the conduit-slot.

In Fig. 15 I show the middle portion or shank of a grip-bar, $g$, provided with a loop, $g'$, the interior of which affords a passage for a slot-cover, and it can also surround the bridge or middle portion of the bed of a raceway. In Fig. 16 I show the middle portion of a grip-bar shank, $h$, provided with an offset at $h'$, so as to afford a passage for a slot-cover. These grip-bar shanks involve merely a vertical movement for gripping and releasing—as, for instance, by means of a hand-lever, or by a screw-threaded shank and a hand-wheel nut, each in a manner well known.

If the gripping is to be accomplished by means of a vertical revolving shaft and a horizontal hand-wheel, as is sometimes desired, the raceway C, as shown in Fig. 18, carries a grip-bar, $i$, screw-threaded at its shank, and a gear-nut, $i'$, tapped thereto, beneath the central portion of the raceway-bed $d$. With grips thus operated, but little range of vertical movement of the bar need be involved, and this can be promptly and readily effected by means of the vertical shaft $k$, stepped in a bearing on the raceway-frame, and provided at its foot with a pinion, $i^2$, which engages with the gear-nut $i'$, and is provided at its top with a hand-wheel, $k'$. This mode of mounting the grip on the raceway enables any form of grip-jaws to be employed which involve but little vertical movement of the grip-bar, it being obvious that the lifting of the grip, as a whole, is here accomplished by lifting the raceway, and hence the screw-bar and gearing shown would operate the well-known form of grip, having laterally-moving jaws, precisely as well as is done by the screw-shank bar and hand-wheel nut heretofore employed.

While I prefer that the bed $d$ of the supporting raceway should continue as a bridge across the central space, $e$, and thus to relieve the grip-bar from actual contact with the chain-cover B, it will be readily seen that said raceway-bed may be cut away centrally and enable the cover to rest in or upon a loop or offset in such grip-bars as are shown in Figs. 15 and 16, especially when the covers are of minimum weight.

Now, referring to Fig. 17, wherein provision is made for a lifted traction-cable, I will next show still another form of grip, well adapted for use therewith, as shown in Fig. 19, wherein the grip has pivoted bow-shaped jaws, $l$, which vibrate toward and from the cable $f$ laterally, and beneath the central portion of the raceway $d$. The spaces $l'$ below and above the pivot $l^2$ in either case afford a path for the chain-cover, (shown in dotted lines,) as in the other forms of grip indicated; but as this grip has no cover-supporting capacity the supporting-bed $d$ is essentially continuous across the central space of the raceway.

I could readily illustrate various other well-considered modes of harmonizing a variety of gripping contrivances to the new conditions involved in the use of my chain-like cover; but I believe that with the disclosures made persons skilled in the art will be readily enabled to make such variations as may seem to be desirable in any particular instance.

I have already indicated that with the main features of my invention it is immaterial in what manner the cover-supporting raceway is attached to and carried by a truck or a car, and that it is equally immaterial what type of gripping devices may be employed therewith.

I will, however, now describe certain features of invention pertaining to the construction of the raceway and the coupling of the same to a car or truck, and the co-operation of a desirable form of grip therewith.

As shown in Figs. 20 and 21, said raceway C is provided with side plates, $n$, which prevent ice or snow from entering the opened slot, and with pivoted plow-faces $n'$, each so far beyond the adjacent end of the raceway that it can scrape or sweep along the covered surface of the conduit; or they are preferably carried a short distance above, so as to thereby remove obstructive quantities of ice or snow or other extraneous matter. Near each end, at the rear of the plow-nose, there is a bearing-wheel, $n^2$, having a flat periphery, for bearing upon and seating the chain-cover B in the conduit-slot at a proper distance from the adjacent end of the supporting-raceway. These wheels $n^2$ may serve as carrying-wheels for the raceway, and they can be supplemented by other flanged wheels—such, for instance, as are shown in Fig. 17—which have their bearings on the conduit at each side of its slot or opening, thus making the raceway a truck in itself capable of carrying an attendant, and only requiring chains or bars for directly coupling it to a car. The wheels $n^2$, when on a raceway which can be raised and lowered, should generally be backed by springs, as shown at $n^3$ in Fig. 22, so that even if the raceway be raised the wheels will still exercise their bearing or seating function on the cover B, although with less pressure when the raceway is elevated than when lowered.

It will obviously be important that when the raceway is carried by a car or truck it should be so supported as to not bear unduly upon the top of the conduit, and also so that it may be adjusted and carried at any desired height. I have therefore suspended the raceway from the truck D by means of links or rods D', two or more of which can be employed, as may be desired, and each is provided with levers or other convenient means, (preferably wheel-nuts, as shown,) by which the raceway can be lifted, lowered, and maintained in any desired plane, or even longitudinally inclined. It will now be observed that with the supporting-raceway as thus carried by the truck it will perform its prime functions, lifting the slot-cover, maintaining it in an elevated position, and guiding it in its return to the slot while exposing a portion of the latter to afford free access to the interior of the conduit for such devices as may be necessary for communicating power to the car or truck. With the cable-gripping appliances, here shown in Figs. 20 and 21, the lower jaw, E', is attached to and is carried by a cover-supporting raceway specially adapted to perform this duty. At the bottom of the central space, $e$, there is a floor or cross-plate, $e^1$, which is longitudinally slotted above and in line with a portion of the conduit-slot, and from this cross-plate $e^4$ there is a pendent plate, $e^2$, hanging in the conduit-slot, and having at its lower end within the conduit a rectangular shelf or seat, which, with its detachable shoe $e^3$, of cast-iron or other suitable material, constitutes this lower gripping-jaw, E'. The upper gripping-jaw, E, has a similar shoe, $o$, attached to a seat, $o'$, on the lower end of a grip-bar, $g$, having a loop, $g'$, as shown in Fig. 15, which accommodates the central portion of the raceway-bed $d$ and the slot-cover B. The upper end of the grip-bar $g$ is coupled, by a link, $g^2$, to a lever, $g^3$, pivoted upon a suitable bridge or cross-plate, $n^3$, which bears upon the tops of the side plates, $n$, of the raceway. The lever $g^3$ extends upward through a slot in the floor of the grip-truck, convenient for manipulation, and for maintaining the grip in driving-contact with the cable the usual locking mechanism can be relied upon, thus relieving the arm of an attendant from unduly severe labor.

It will be readily seen that, as here shown, the entire traction strain can be communicated from the cable to the grip, and then to the truck, by way of the rods D'; but it will be obvious that these rods may be supplemented by draft-chains, connecting the body of the truck or car to the raceway, or by buffers on the raceway abutting against pendent swiveled brackets beneath the car, in which case the rods D' may be wholly freed from all but lifting-strains, and chains could therefore be used in lieu of said rods.

It must not be understood that the use of my chain-like cover and its lifting and supporting raceway precludes the use of a gripping apparatus, which, as heretofore, is suspended from the floor of a truck or car, instead of being mounted upon and carried by the raceway. In Fig. 24 I show a shank, $p$, bent or offset at one side, so as to laterally extend from a central point above the cover to a proper point beneath it, and the shank $p'$ is similarly formed, but is fitted to slide in a dovetailed groove in the shank $p$. The opening $g'$ is thus afforded, as in Fig. 15, and if both shanks be extended upward through the floor of a truck and suspended therefrom either of them can be raised or lowered independently of the other and one of them used for supporting and adjusting the jaws vertically and the other for opening and closing the jaws, as in certain well-known forms of grip.

With my novel conduit-cover it will be seen that not only can slots of ordinary width be desirably closed, but that slots or openings can be employed of such width as could not be practically employed without a cover, which, while readily lifted in a vertical line, will be securely seated as against all ordinary displacing influences. The main portions of a conduit need only be large enough to accommodate the cable and the grip, while at proper intervals, as shown in Fig. 23, there are wheel-pits $q$, containing grooved bearing-wheels $q'$, which can, as heretofore, be connected with suitable drains.

Having thus described my invention, I claim as new and desire to secure by Letters Patent—

1. The combination, substantially as hereinbefore described, of a conduit accessible through a continuous open top or slot, and adapted to accommodate means for communicating power to railway-cars from a stationary motor, and a cover composed of independent rigid sections flexibly united at their ends and essentially forming a continuous chain-like cover for the conduit.

2. The combination, substantially as hereinbefore described, of an open-topped or slotted conduit, a chain-like cover for said conduit, essentially composed of independent rigid sections flexibly united at their ends, and a cover-supporting raceway, which projects at its ends into said conduit, substantially as described, whereby as said raceway is moved in either direction it progressively lifts each section of said cover from the conduit and supports it until it is dropped upon its seat, and affords beneath the elevated portion of the cover continuous access to the interior of the conduit.

3. The combination, substantially as hereinbefore described, of an open-topped or slotted conduit, a continuous flexible cover for said conduit, a cover lifting and supporting raceway provided with side plates, which prevent the entrance of ice or snow to the slot when the cover is lifted, and affording access to said conduit beneath an elevated portion of said cover, and a truck or car by which said raceway is carried.

4. The combination, substantially as hereinbefore described, of an open-topped or slotted traction-cable conduit, a continuous flexible cover for said conduit, a cover lifting and supporting raceway, and a cable-grip extended into said conduit beneath the portion of the cover lifted by said raceway.

5. The combination, substantially as hereinbefore described, of a conduit, its continuous flexible cover, a truck or car, and a cover lifting and supporting raceway provided with side plates and with pivoted plow-faces at its ends, and which is adjustably suspended beneath said car or truck, for enabling said side pieces and plow-faces to be so located with reference to the top of the conduit that snow and ice may be properly displaced above said cover and prevented from falling into the opened portion of the conduit beneath the raceway.

6. The combination, substantially as hereinbefore described, of an open-topped or slotted conduit, a series of rigid independent sections flexibly united at their ends and forming a chain-like cover for said conduit, a raceway for progressively lifting and supporting said sections, and thereby exposing underlying portions of the conduit, and a bearing-wheel near the end of said raceway for progressively seating each section of the cover at the rear of and during the forward movement of said raceway.

7. The combination, substantially as hereinbefore described, of an open-topped or slotted conduit, a continuous flexible cover for said conduct, a raceway for progressively lifting and supporting portions of said cover, and bearing-wheels on said raceway, which have their paths in the slot and upon the upper surface of the conduit and beneath the elevated portion of the cover.

8. The combination, substantially as hereinbefore described, of a cable-conduit, the continuous flexible cover, a raceway for progressively lifting and supporting a portion of said cover, and a cable-gripping apparatus mounted on and carried by said raceway.

9. The combination, substantially as hereinbefore described, of a cable-railway conduit, a continuous flexible cover, a raceway for progressively lifting and supporting portions of said cover, and gripping apparatus provided with a grip-bar shank which affords a passage for the elevated portion of said cover.

HARVEY C. LOWRIE.

Witnesses:
EDMUND P. MARTIN,
ANDREW RYAN.